United States Patent
Li et al.

(10) Patent No.: US 8,620,139 B2
(45) Date of Patent: Dec. 31, 2013

(54) UTILIZING SUBTITLES IN MULTIPLE LANGUAGES TO FACILITATE SECOND-LANGUAGE LEARNING

(75) Inventors: Chi Ho Li, Beijing (CN); Matthew Robert Scott, Beijing (CN)

(73) Assignee: Microsoft Corporation, Redmond, WA (US)

( * ) Notice: Subject to any disclaimer, the term of this patent is extended or adjusted under 35 U.S.C. 154(b) by 78 days.

(21) Appl. No.: 13/097,070

(22) Filed: Apr. 29, 2011

(65) Prior Publication Data

US 2012/0275761 A1 Nov. 1, 2012

(51) Int. Cl.
*H04N 9/80* (2006.01)
*H04N 5/92* (2006.01)
*H04N 9/82* (2006.01)
*G06K 9/34* (2006.01)

(52) U.S. Cl.
USPC ........... 386/244; 386/239; 386/245; 386/246; 386/247; 386/248; 386/249; 382/173; 382/176; 382/177

(58) Field of Classification Search
USPC ......... 386/239, 244, 245, 246, 247, 248, 249; 382/173, 176, 177
See application file for complete search history.

(56) References Cited

U.S. PATENT DOCUMENTS

| | | | |
|---|---|---|---|
| 7,054,804 B2 | 5/2006 | Gonzales et al. | |
| 7,593,060 B2 | 9/2009 | Yoo et al. | |
| 2003/0190148 A1* | 10/2003 | Lee | 386/70 |
| 2004/0081434 A1* | 4/2004 | Jung et al. | 386/95 |
| 2007/0112685 A1* | 5/2007 | Yamamichi | 705/64 |
| 2007/0189724 A1 | 8/2007 | Wan et al. | |
| 2007/0292115 A1* | 12/2007 | Yang | 386/125 |
| 2009/0019009 A1 | 1/2009 | Byers | |
| 2010/0208139 A1* | 8/2010 | Hii | 348/571 |
| 2010/0260477 A1 | 10/2010 | Zhang et al. | |
| 2010/0332214 A1* | 12/2010 | Shpalter et al. | 704/2 |

OTHER PUBLICATIONS

Buehler, et al., "Learning sign language by watching TV (using weakly aligned subtitles)", Retrieved at << http://ieeexplore.ieee.org/stamp/stamp.jsp?tp=&arnumber=5206523 >>, IEEE Computer Society Conference on Computer Vision and Pattern Recognition (CVPR), Jun. 20-25, 2009, pp. 2961-2968.

"VobSub Subtitle Ripping, Playback and Permanent Subtitle Guide", Retrieved at << http://www.digital-digest.com/articles/vobsub_print.html >>, Dec. 17, 2005, pp. 1-10.

"Xilisoft DVD Subtitle Ripper", Retrieved at << http://www.xilisoft.com/dvd-subtitle-ripper.html >>, Retrieved Date: Feb. 2, 2011, pp. 1-3.

Kan, Michael., "Microsoft adds Karaoke to China's Bing Dictionary", Retrieved at << http://news.techworld.com/applications/3257841/microsoft-adds-karaoke-to-chinas-bing-dictionary/ >>, Jan. 24, 2011, pp. 1-4.

Piperidis, et al., "Infrastructure for a Multilingual Subtitle Generation System", Retrieved at << http://sifnos.ilsp.gr/musa/publications/Infrastructure%20for%20a%20multilingual%20subtitle%20generation%20system-final.pdf >>, 9th International Symposium on Social Communication, 2005, pp. 1-5.

* cited by examiner

*Primary Examiner* — Daquan Zhao
(74) *Attorney, Agent, or Firm* — Medley, Behrens & Lewis, LLC (57) ABSTRACT

Processing video for utilization in second language learning is described herein. A video file includes spoken words in a source language, subtitles in the source language, and subtitles in a native language of an end user (a target language). The subtitles in the source language are synchronized with the spoken words in the video, and the subtitles in the source language are mapped to the subtitles in the target language. Both sets of subtitles are displayed simultaneously as the video is played by the end user.

20 Claims, 10 Drawing Sheets

FIG. 10

UTILIZING SUBTITLES IN MULTIPLE LANGUAGES TO FACILITATE SECOND-LANGUAGE LEARNING

BACKGROUND

Video can be augmented to provide additional content that is germane to such video. In an example, closed captioning can be utilized to provide a transcription of speech in a television program to viewers that are hearing impaired. In closed captioning systems, text is encoded in the video stream and is only provided to viewers that wish to view such captions. Closed captions were historically created for hearing impaired to assist in comprehension of video. Closed caption systems can also be employed as a tool to assist individuals in learning to read, in an environment where audio is difficult to hear, or where audio volume is intentionally muted. Additionally, closed caption systems can provide viewers with further context pertaining to content of a video feed, such as identity of speakers in the video feed, an identity of background music (through utilization of certain symbols), an identity of particular sound effects (through utilization of certain words or symbols), etc.

Subtitles are similar to captions in that transcription of spoken words in a video is provided to viewers. While subtitles can be distinguished from captions, as conventionally subtitles do not include sound effects, symbols that are indicative of music being played in the background, identities of speakers and the like, for the purposes of this disclosure captions and subtitles can have a substantially similar meaning.

Due to the increase in availability of films in different languages (e.g., through web-based video streaming applications or specialized video rental services), subtitles have become increasingly prevalent. Additionally, television programs that include spoken words in a first language have been syndicated for viewing in countries that have a second language as a native language. Oftentimes, however, an individual desiring to view a film or television program cannot comprehend the subject of the video without subtitles. Accordingly, subtitles are now commonly included with various video files, thereby allowing those that speak languages other than a language spoken in the film can enjoy such film, and studio profits can be increased due to larger audience.

SUMMARY

The following is a brief summary of subject matter that is described in greater detail herein. This summary is not intended to be limiting as to the scope of the claims.

Described herein are various technologies pertaining to providing subtitles in different languages in a video file for viewing by a user, wherein such subtitles are synchronized with spoken words in the video file. Studies have indicated that subtitles in video files can be utilized in connection with second language learning. More particularly, in countries where television programming is broadcast in English but subtitles are displayed in the native language of viewers, higher proficiencies in the English language are achieved by such viewers. Furthermore, difference in English proficiency between those that viewed television programming in English with subtitles in a native language versus those that do not amounts to approximately 4 to 20 years of formal education. The aspects described herein further support second language learning by providing multiple subtitles together in a video file, wherein first subtitles are in a source language (the language of spoken words in the video file), and second subtitles are in a target language (the native language of the viewer of the video file). Furthermore, these subtitles can be synchronized with spoken words in the video file, such that words in both sets of subtitles can be highlighted as such words are spoken in the video file. Additionally, definitions of spoken words can be embedded in the video, wherein selection of a word in a subtitle shown in the non-native language of the user can be selected, which can cause a definition of such word to be presented to the user in the native language of the user. Therefore, in an example, an interactive experience can be presented to the user, wherein the user can interact with subtitles to obtain additional information about certain words or phrases in the video file that are in the non-native language of the user.

In an exemplary embodiment, video files can be accessible to users of a Web browser that have a particular plug-in installed that facilitates interaction with subtitles in the video file. For instance, a viewer can log on to a particular web page and can select a video file for viewing. Responsive to receipt of this selection, the video can be streamed to the client computing device of the user. As indicated above, this video file that is streamed to the client computing device can include a first set of subtitles that are in a source language (a language that is utilized by speakers in the video file, wherein the source language is not native to the user) and a second set of subtitles that are in the native language of the user. These subtitles can be synchronized with spoken words in the video file such that the user can ascertain which spoken words correspond to words in the subtitles as the words are spoken in the video file.

Various techniques can be utilized to provide the subtitles in multiple languages, synchronization, and interactivity to a viewer of a video file. Pursuant to an example, a first user can upload a video (e.g., that is captured through utilization of a client computing device such as a hand-held video camera), wherein spoken words in the video are in a source language. Optionally, the first user may provide subtitles in the language that is spoken in the video file. Alternatively, speech recognition technology can be employed to automatically generate a transcription of spoken words in the video file. It can also be understood that the transcription may be desirably segmented into particular portions of text that will make sense to a reader. Therefore, for example, the transcription can be segmented into sentences or particular phrases. Again, this segmentation can be done manually (e.g., by the provider of the video file) or alternatively, natural language processing techniques can be employed in connection with automatically segmenting the transcription into a first plurality of segments, wherein such first plurality of segments are in the source language.

Subsequently, a translation of the segments from the source language to the target language can be generated, for instance, through utilization of a machine translation system. Alternatively, the translation of the second segments can be manually generated or received, for instance, from the first user who uploads the video file. Therefore, a segment in the first plurality of segments will correspond to a segment in the second plurality of segments, wherein words in a segment from the first plurality of segments are in the source language, and words in a segment from the second plurality of segments are in the target language.

Once the first plurality of segments and the second plurality of segments are correlated, words in such segments can be aligned with one another. For instance, a word in a first segment in the first plurality of segments can be aligned with a word in the second segment in the second plurality of segments. In some cases, a word in the source language will not map to a word in the target language. Additionally, a word in the target language may not map to a word in the source language. Still further, multiple words in the source language may map to a single word in the target language, while multiple words in the target language may map to a single word in the source language. When word alignment is undertaken, these different possibilities can be contemplated such that, for example, three words in the source language may be aligned with two words in the target language, while in another case, one word in the source language may be aligned with a single word in the target language. This alignment can be undertaken such that aligned words or phrases can be shown in graphical relation to one another, so that the user that views the video file can quickly ascertain words in the target language subtitles that are translations of aligned words in the source language subtitles.

Moreover, the words in these segments can be synchronized with audio of the video file. Since the words in the first plurality of segments are aligned to words in the second plurality of segments, synchronization of the words in the first plurality of segments in the source language subtitles with audio of the video file also synchronizes words in the target language subtitles with the audio of the video file. Accordingly, as the video file is played, aligned words in both sets of subtitles can be highlighted as corresponding spoken words in the video file are audibly output. Additionally, as alluded to above, dictionary definitions for words in the source language subtitles can be obtained in the native language of the user. These dictionary definitions, for example, can be linked to the words in the source language subtitles.

At the client computing device, a video player can be configured to receive and play such video file wherein, when viewed by the user, spoken words are highlighted in both the source language subtitles in the target language subtitles, and the segments are presented to the user in a manner that can make sense to the user. As the words are spoken in the video file, corresponding words in displayed segments in both the source language subtitles and the target language subtitles are highlighted. If the viewer becomes confused or desires to obtain additional information, the viewer can interact with the video file, for instance, by selecting a particular word in either the source language subtitles or the target language subtitles. Selection of such word can cause the video to be paused and can, for instance, cause a corresponding word in the other subtitles to be highlighted. Therefore, the user can quickly identify translations of words. Additionally, selection of a particular word can cause the video to be directed to a certain position, such that the selected word is audibly output to the user. Therefore, for instance, the user can quickly ascertain how a particular word in the source language is pronounced. Moreover, for instance, by right-clicking or performing some other selection method on a particular word in the source language subtitles, a definition of such word can be provided to the user in the native language of such user. Accordingly, for instance, if a particular word in the source language subtitles is not aligned to a word in the target language subtitles (indicating a lack of a direct translation), the user can select such word in the source language subtitles and be provided with a definition of the word in the target language (the native language of the user). Moreover, in an exemplary embodiment, the player can be configured with search functionality such that the user can perform a search for a particular word or phrase, and responsive to such search, the video player can cause the video file to be played to the user where such word or phrase is spoken. Therefore, if the user is interested in a particular word that is known to the user in the native language of such user, then the user can enter a query to the player which can cause the player to search the subtitles for the word and can direct the video file to the point in the video file where such word is spoken.

Other aspects will be appreciated upon reading and understanding the attached Figs. and description.

DETAILED DESCRIPTION

Various technologies pertaining to second language learning through utilization of subtitles in video files will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 1:
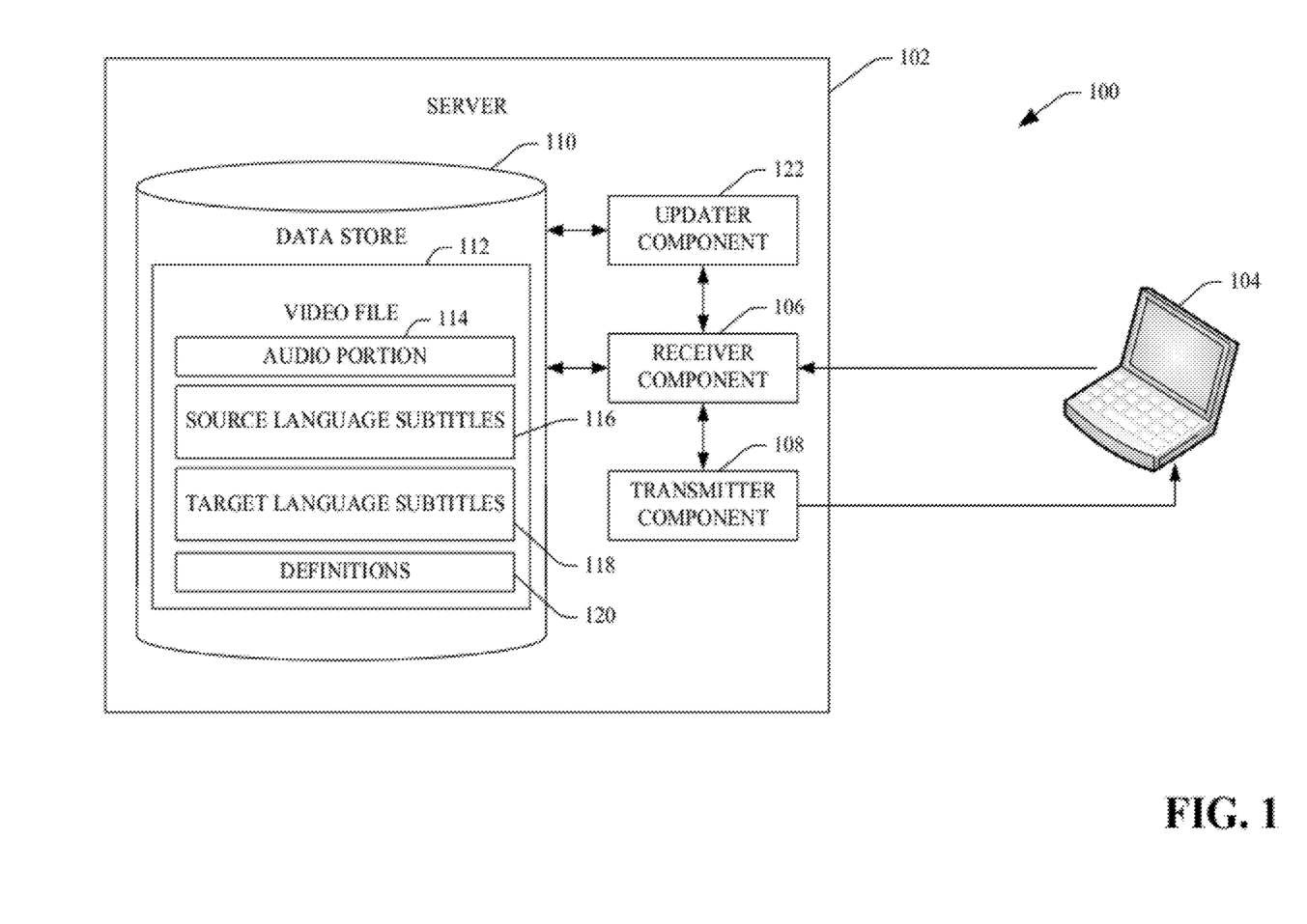
FIG. 1 is a functional block diagram of an exemplary system that facilitates providing a client computing device with a video file that includes subtitles in various languages that are synchronized to spoken words in the video file.

With reference now to FIG. 1, an exemplary system 100 that facilitates providing a video file to a user by way of a network connection, wherein the video file comprises subtitles in different languages that are synchronized with an audio portion of the video file, is illustrated. The system 100 comprises a server 102 and a client computing device 104. The server 102 and the client computing device 104 may be in communication by way of a suitable network connection such as, for instance, the Internet. The client computing device 104 may be, for instance, a personal computer, a laptop computer, a tablet computer, a personal digital assistant, a portable media player, a portable gaming console, a portable telephone, some suitable combination thereof, or the like. Pursuant to an example, the client computing device 104 may have installed thereon an application that facilitates viewing video files that are adapted to include subtitles in various different languages that are synchronized to an audio portion of such video file. For instance, such a video player may be a plug-in to a Web browser that is installed on the client computing device 104. Additionally or alternatively, the player may be a standalone application that executes on the client computing device 104.

The server 102 comprises a receiver component 106 that receives a request for a particular video file from the client computing device 104. The server 102 further comprises a transmitter component 108 that is in communication with the receiver component 106, wherein the transmitter component 108 can access a data store 110 that resides on such server 102 or is accessible to the server 102. The data store 110 comprises a video file 112, wherein the video file 112 is the subject of the request received by the receiver component 106. The video file 112 may be in any suitable video format. The video file 112 includes an audio portion 114 that comprises spoken words in a source language. For instance, the video file 112 may include video of a particular person that is speaking, and words spoken by such person can be in the source language and included in the audio portion 114.

The video file 112 has further been processed to include first subtitles that are in the source language, wherein such subtitles are referred to herein as source language subtitles 116. As will be described below, the source language subtitles 116 can be automatically generated by way of a computer process or can be manually generated for the video file 112. The source language subtitles 116 may be segmented into source language segments, wherein such segments are understandable phrases or sentences of the source language. Accordingly, in an example, the source language segments may be sentences. Additionally or alternatively, the source language segments may be phrases. Again, the source language subtitles 116 can be segmented into the source language segments through utilization of a computer-executable process. Alternatively, such segmentation can be undertaken manually.

The video file 112 has been further processed to include target language subtitles 118, wherein the target language subtitles 118 are in a target language (the native language of the user of the client computing device 104). Pursuant to an example, the target language subtitles 118 can be segmented target language segments, such that a segment in the source language segments corresponds to a segment in the target language segments. Therefore, for instance, if the source language segments are sentences, the target language segments are sentences in the target language. Moreover, segments in the source language segments can be linked to corresponding segments in the target language segments, such that when the video file 112 is viewed at the client computing device 104, a segment in the source language segments is shown together with a translation of such segment (a segment in the target language segments) at the client computing device 104. Moreover, and as will be described below, words in a first segment from the source language segments can be aligned with words in a second segment in the target language segments. This alignment can be undertaken such that a viewer of the video file 112 can quickly ascertain which word in the native language of the user is a translation of a word in the source language when the viewer is viewing the video file 112 at the client computing device 104.

The video file 112 may also optionally comprise definitions 120 for one or more words included in the source language subtitles 116, wherein such definitions 120 can be in the target language (the native language of the user of the client computing device 104). Moreover, such definitions 120 can be linked to words in the source language subtitles 116. Accordingly, when the video file 112 is viewed at the client computing device 104, the viewer of the video file 112 can select a word in the source language subtitles 116 that is displayed to the viewer, and responsive to such selection, one of the definitions 120 in the native language of the viewer can be displayed on a display screen of the client computing device 104. Thus, the viewer of the video file 112 can be quickly provided with a definition for a word in the source language that is not understood by the viewer of the video file 112. Responsive to the receiver component 106 receiving the request for the video file 112 from the client computing device 104, the transmitter component 108 can cause the video file 112 to be streamed, for instance, to the client computing device 104. Additionally or alternatively, rather than providing the video file 112 in streaming format, the transmitter component 108 can cause the video file 112 to be downloaded to the client computing device 104 (e.g., with one or more digital rights management restrictions). In any event, the user of the client computing device 104 can view the video file 112 and interact with such video file 112 to aid in connection with learning the source language.

The server 102 may also optionally include an updater component 122 that may be in communication with the receiver component 106. For example, when the viewer of the video file 112 at the client computing device 104 views such video file 112, the viewer may note one or more errors in the target language subtitles 118. For instance, the target language subtitles 118 may be generated through utilization of a machine translation system and as will be understood, such machine translation systems, while generally accurate, may be imperfect. Accordingly, the viewer of the video file 112 may have a strong understanding of the target language and may notice an error in the target language subtitles 118. This error may be in a word that is included in the target language subtitles 118, an alignment of a word in the target language subtitles 118 to a word in the source language subtitles 116, an error in synchronization of the audio portion 114 with one or more words in the target language subtitles 118, or some other error. The viewer of the video file 112 on the client computing device 104 can make note of such error and can inform the server 102 of the error by way of the receiver component 106. The updater component 122 can receive this update provided by the viewer and can cause for instance, the target language subtitles 118 to be updated to correct the error noted by the viewer. Prior to the updater component 122 updating the target language subtitles 118 or other portion of the video file 112, a moderator may review the update and can cause the updater component 122 to complete such update after moderation has been completed.

While the system 100 has been described in connection with a server and client computing device that are in communication by way of a network, it is to be understood that the video file 112 may be included in other media. For instance, the video file 112 may be stored on a DVD or Blu-Ray disc and inserted into an appropriate media player. Once inserted, the user may view the video file 112 on a television and can interact with the video file 112 as described above. Additionally or alternatively, the server 102 may be utilized in connection with broadcasting television content wherein, a television program can be presented with the source language subtitles 116 and the target language subtitles 118 (segmented as described above), such that when the television program includes spoken words, both sets of subtitles are displayed to the viewer on a television. As television permits increased interactivity, some of the features described with respect to the client computing device 104 may be employed through the television, such as selection of particular words and subtitles, presentation of dictionary definitions, or the like. Additional embodiments will be described below.

Furthermore, in an exemplary embodiment, the video file 112 can comprise subtitles in other languages that are mapped to the source language subtitles 116, such that different users that have different native languages can utilize the video file 112 in connection with learning the source language. Thus, the user can select their native language from amongst a plurality of available choices, and subtitles in the native language can be provided to the user together with the source language subtitles 116.

Figure 2:
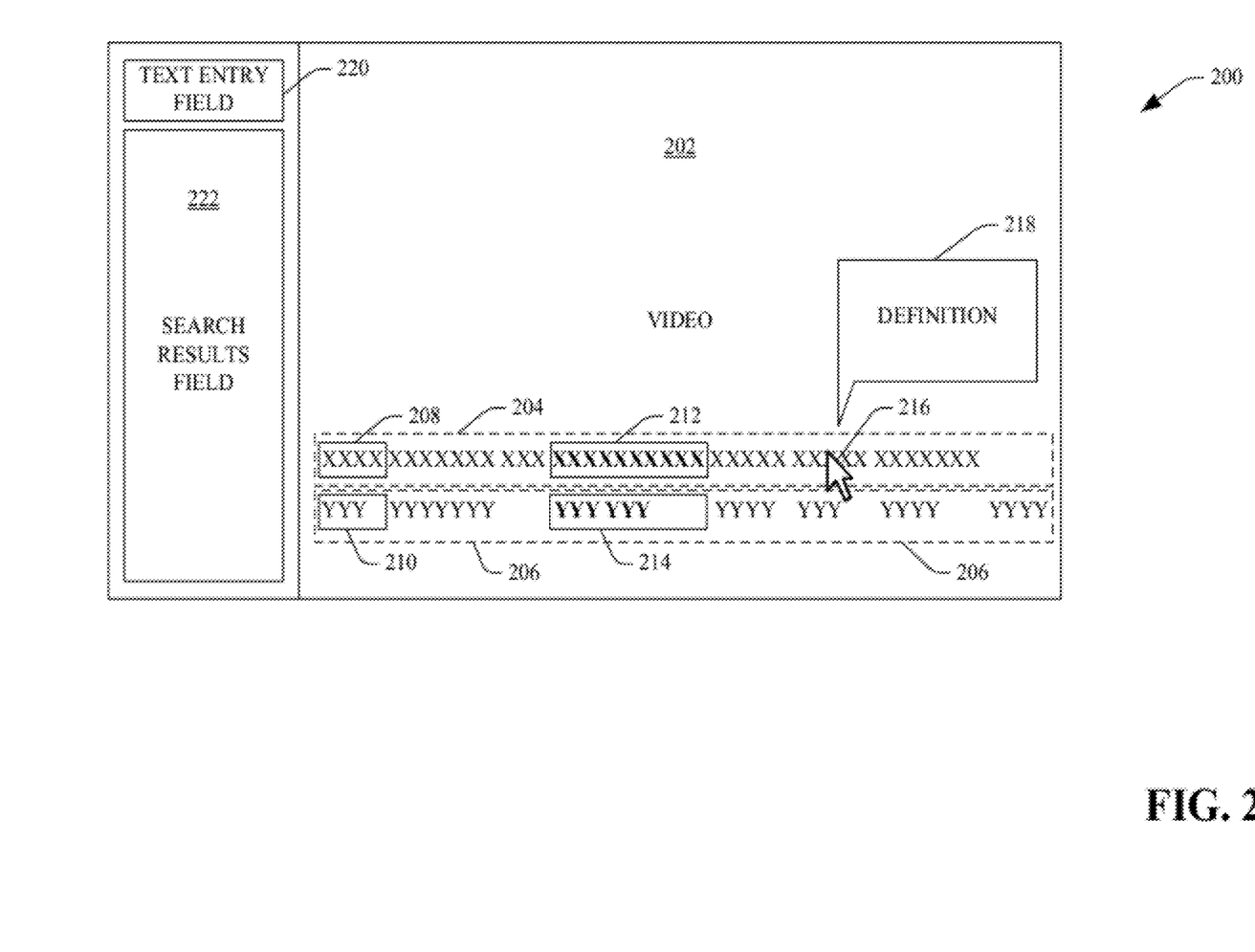
FIG. 2 is an exemplary graphical user interface that illustrates subtitles in different languages being presented together to a user.

With reference now to FIG. 2, an exemplary graphical user interface 200 of a video player application that can be executed on the client computing device 104 is illustrated. A graphical user interface 200 includes a video field 202 that is configured to play the video file 112 received from the server 102. As indicated above, spoken words in the video file displayed in the video field 202 can be in a source language. Additionally, the video field 202 can comprise a first segment 204 from the source language subtitles 116, and a second segment 206 from the target language subtitles 118 described above. The first segment 204 includes a plurality of words in the source language while the second segment 206 is a translation of the first segment in the target language (the native language of the user). For instance, the first segment 204 may correspond to a plurality of spoken words in video displayed in the video field 202, wherein the plurality of spoken words includes a sentence or phrase. The words in the second segment 206 can be a translation of the words in the first segment 204. Words in the first segment 204 can be graphically (vertically) aligned with words in the second segment 206 such that a viewer of the video displayed in the video field 202 can quickly ascertain which words in the second segment 206 are translations of particular words in the first segment 204. For example, words that are vertically aligned with each other between the first segment 204 and the second segment 206 may indicate a translation from the source language to the target language for such words. Therefore, for example, a first word 208 in the first segment 204 can be vertically aligned with a second word 210 in the second segment 206, thereby indicating that the second word 210 is a translation of the first word 208.

Moreover, the words in the first segment 204 can be synchronized with spoken words in the video displayed in the video field 202, and words in the second segment 206 can be linked to the words in the first segment 204. Accordingly, as spoken words occur in the video displayed in the video field 202, corresponding words in the first segment 204 and the second segment 206 can be highlighted, thereby providing the viewer with an indication of how a particular word is pronounced in the source language. In the example shown in FIG. 2, a third word 212 in the first segment 204 and a fourth word 214 in the second segment 206 can be highlighted as the word is spoken in the video displayed in the video field 202.

Furthermore, as indicated above, the video playing application can support user interaction with the video file displayed in the video field 202. In a first example, the user can utilize a cursor 216 to select a particular word, for instance, in the first segment 204. Selection of such word in the first segment 204 can cause a corresponding word in the second segment 206 to be highlighted (a translation of the selected word in the second segment). Moreover, selection of a word in the first segment 204 can cause the video to be played commencing at a position that causes the word to be audibly output in the source language. While the cursor 216 is shown as an example, it is to be understood that the user can select a particular word through a touch, a gesture or the like. Additionally, rather than selecting a word in the first segment 204, the user can select one of the words in the second segment 206, which can have a substantially similar effect (e.g., a corresponding word in the first segment 204 can be highlighted to inform the user of the translation of the selected word in the second segment 206, and the video file can be played commencing from a point where the selected word is spoken).

Furthermore, the user may wish to understand a meaning of one or more words of the first segment 204. Pursuant to an example, the user may cause the cursor 216 to be hovered over a word of interest in the first segment 204. Alternatively, the user can utilize the cursor 216 to select a word in the first segment 204, such as through pointing and right clicking Responsive to the user selecting a particular word with the cursor 216, a definition for the selected word in the target language (the native language of the user) can be presented in an inline pop-up 218. This may be particularly beneficial, for instance, if the selected word in the first segment is not aligned with a word in the second segment 206, which may possibly occur over the course of a translation. For instance, a particular word in the source language may have no corresponding translation in the target language. Furthermore, when the user selects the word with the cursor 216 to cause a definition to be displayed, the video shown in the video field 202 can be paused.

The graphical user interface 200 further comprises a text entry field 220, where a user can enter content pertaining to a search and/or an update of the source language subtitles 116 and/or the target language subtitles 118. Pursuant to an example, the user may review the first segment 204 and the second segment 206 and may determine that an error exists in a translation between a word in the first segment 204 and a word in the second segment 206. The user can indicate such error, for instance, by entering data describing the error in the text entry field 220 and depressing a button (not shown) that causes the data describing the error to be transmitted to the server 102. In another exemplary embodiment, the user can employ the cursor 216 or other selection mechanism to select a particular word or arrangement of words in the first segment 204 and/or the second segment 206, and may indicate an error when an online pop-up error reporting tool is presented to the user.

In an another exemplary embodiment, the user can cause a search to be performed by entering a query into the text entry field 220, wherein the search is configured to locate a particular word or phrase in either the source language subtitles 116 or the target language subtitles 118 in the video file. Again, subsequent to providing the text entry field 220 with a query, the user can depress a button (not shown) that causes the query to be executed over the source language subtitles 116 and the target language subtitles 118. A search results field 222 can cause the search results that are returned based at least in part upon the query to be presented to the user. The user may then select one of the search results which may be a word, a phrase, or a segment, and the video player can cause the video to commence to a position that includes that word, phrase, or segment. Still further, the search results field 222 may include an alphabetical list of words or phrases in the source language subtitles or the target language subtitles. Accordingly, the user can quickly search for certain words, phrases or segments that are existent in the video file, and can cause the video player to play the video file at a particular point where such words, phrases or segments are spoken in the video file. Moreover, the graphical user interface 200 may include conventional tools such as a mechanism for rewinding, selecting a particular point in time of the video file, causing the video file be moved in the forward direction, etc.

Figure 3:
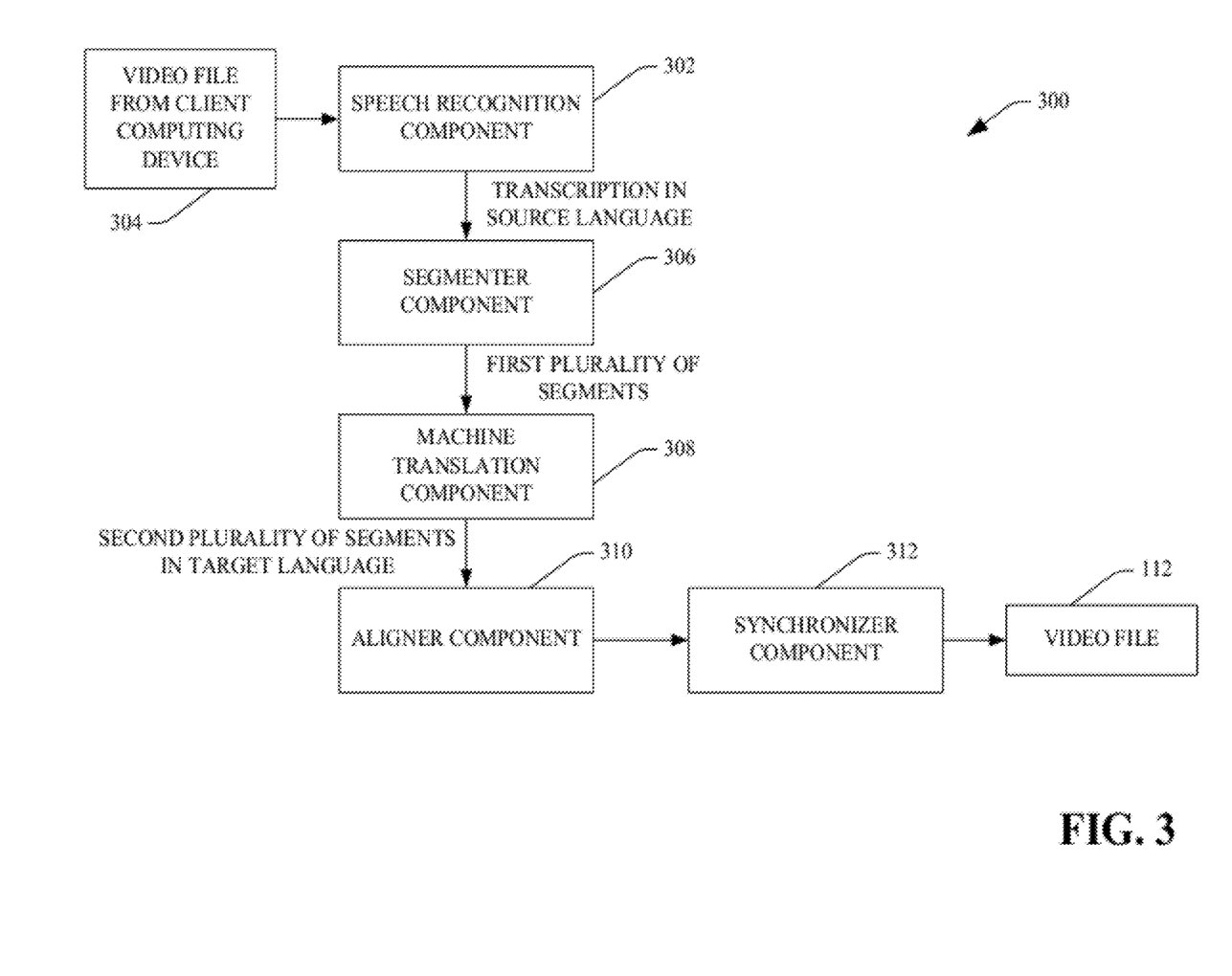
FIG. 3 is a functional block diagram of an exemplary system that facilitates processing a video file to cause the video file to include subtitles in different languages that are synchronized with spoken words in the video file.

With reference now to FIG. 3, an exemplary system 300 that facilitates processing a video file to cause such video file to include source language subtitles and target language subtitles, wherein such subtitles are synchronized with spoken words in the video file. The system 300 includes a speech recognition component 302 that can receive a video 304 file from a client computing device. For example, a user may create the video file through utilization of a camera that is integral to a portable computing device, such as a mobile telephone, a tablet computing device, or the like. For example, the speech recognition component 302 can receive the video file 304 from the client computing device by way of an Internet connection, such that the user that provided the video file 304 from the client computing device desires to upload such video file for utilization in connection with second language learning. The speech recognition component 302 can process the video file 304 from the client computing device to automatically generate a transcription of spoken words in the source language in the video file 304 from the client computing device. While the system 300 is shown to include the speech recognition component 302, which can be a computer executable application that is configured to automatically generate the transcription of spoken words in the video file 304 from the client computing device, it is to be understood that the user of the client computing device may manually provide such transcription, or the transcription can be manually generated by another.

The system 300 may further comprise a segmenter component 306 that can receive the transcription in the source language of spoken words in the video file 304 and can segment such transcription into a plurality of source language segments. These segments, for instance, may be sentences. Alternatively, the segments may be phrases. Still further, the segments may be sentences, unless a length of such sentence is above a threshold, wherein the segment or component 306 can choose a position to segment the sentence (e.g., at a particular clause). Therefore, it is to be understood that the segmenter component 306 can utilize natural language processing techniques to effectively segment the transcription in the source language into a plurality of source language segments.

The system 300 may further comprise a machine translation component 308 that is in communication with the segmenter component 306, such that the machine translation component 308 receives the source language segments from the segmenter component 306. The machine translation component 308 can be configured to translate words in the source language segments to generate target language segments. In other words, for each segment in the source language segments received by the machine translation component 308, the machine translation component 308 can output a corresponding target language segment. Accordingly, the machine translation component 308 can generate links between segments in different languages.

An aligner component 310 can receive segments in the source language segments and target language segments, and can perform word alignment on words in such segments. With more specificity, the aligner component 310 can receive a first segment from the source language segments, wherein such first segment comprises a plurality of words in the source language. The aligner component 310 can additionally receive a second segment from the target language segments that includes translations of words in the source language to the target language. The aligner component 310 may then align particular words in the two segments such that words from the source language are vertically aligned with words in the target language that are translations of the words in the source language.

Pursuant to an example, the aligner component 310 can perform a one-to-one alignment. For instance, the aligner component 310 can have access to a dictionary that defines translations between words in two languages, can receive a word in the first segment and can search the dictionary for a matching word in the second segment. If no matching words exist, then the first word may be unaligned. This process can be repeated for each word in the first segment until all words of the first segment are aligned with words in the second segment, or a determination is made that a word in the first segment remains unaligned. More advanced aligning techniques may also be employed by the aligner component 310 such that the aligner component 310 can contemplate a one-to-many mapping or a many-to-one mapping. Therefore, for instance, if a single word in the first segment is translated to multiple words in the second segment, then the multiple words in the second segment can be vertically aligned with the aforementioned word in the first segment. Moreover, the aligner component 310 can establish links between words in segments in the source language segments and words in segments in the target language segments.

A synchronizer component 312 can receive the source language segments and can synchronize words in the source language segments with words in the video file 304. In other words, words in the source language segments can have timestamps assigned thereto that correspond to a time in the video file 304 when such words are spoken. As the words in the source language segments have been linked to words in the target language segments, the words in the target language segments can also be synchronized with spoken words in the video file 304. The resulting output after synchronization may be, for instance, the video file 112.

While much of the processing described as being undertaken in the system 300 is automated, it is to be understood that one or more of such process steps can be manually undertaken by one or more individuals. For instance, a user may manually perform translation between words in the source language and words in the target language. Additionally, segmentation can be manually undertaken as can word alignment. It is to be understood, however, that the system 300 comprises a fully automated approach to processing a video file to prepare such file in connection with facilitating second-language learning.

Figure 4:
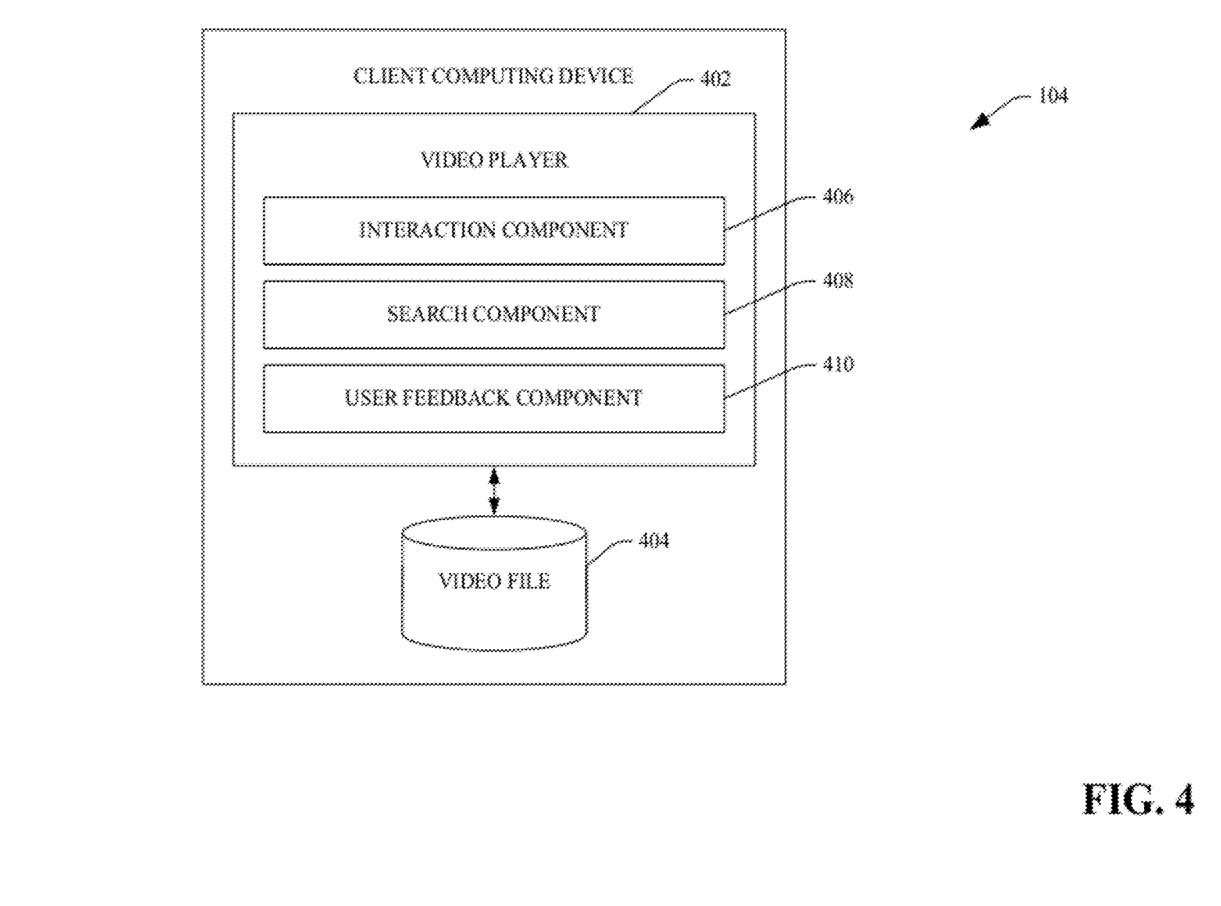
FIG. 4 is a functional block diagram of an exemplary client computing device that can be employed to view and interact with a video file that comprises subtitles in different languages that are synchronized with spoken words in the video file.

With reference now to FIG. 4, a functional block diagram of the client computing device 104 is illustrated. The client computing device 104 comprises a video player 402, which is a computer executable application that is configured to display a video file that is in the format of the video file 112. Here, such video file 112 is shown to be retained in a data repository 404 on the client computing device 104, wherein the video player 402 can access the video file from the data repository 404. Accordingly, for instance, the data repository

404 may be hard drive on the client computing device, a portion of memory, a video buffer, or the like.

The video player 402 comprises an interaction component 406 that can detect user interaction with one or more words displayed in either a first set of subtitles (source language subtitles) or second set of subtitles (target language subtitles) together with video. As described previously, this interaction may be a selection of a particular word that included in source language or target language subtitles, a hovering over a word in the source language or the target language subtitles, etc.

The video player 402 further comprises a search component 408 that is configured to receive a query from the user and perform a search over words in subtitles of the video based at least in part upon the query. This allows the user to search for particular words of interest in either the source language or the target language, and to quickly cause the video player 402 to play the video at a point in time that corresponds to a selected word in either the source language or target language.

The video player 402 additionally comprises a user feedback component 410 that receives feedback from the user as to accuracy of subtitles in either the source language or the target language. For instance, through viewing an analysis of certain words or phrases showing subtitles, the user can ascertain that one or more subtitles or words have been incorrectly translated during machine translation or incorrectly aligned during alignment, and can notify the server 102 of such incorrect translation or alignment. At the server 102, the video file can be reprocessed to update such video file 112 to be corrected in view of the feedback received from the user.

Figure 5:
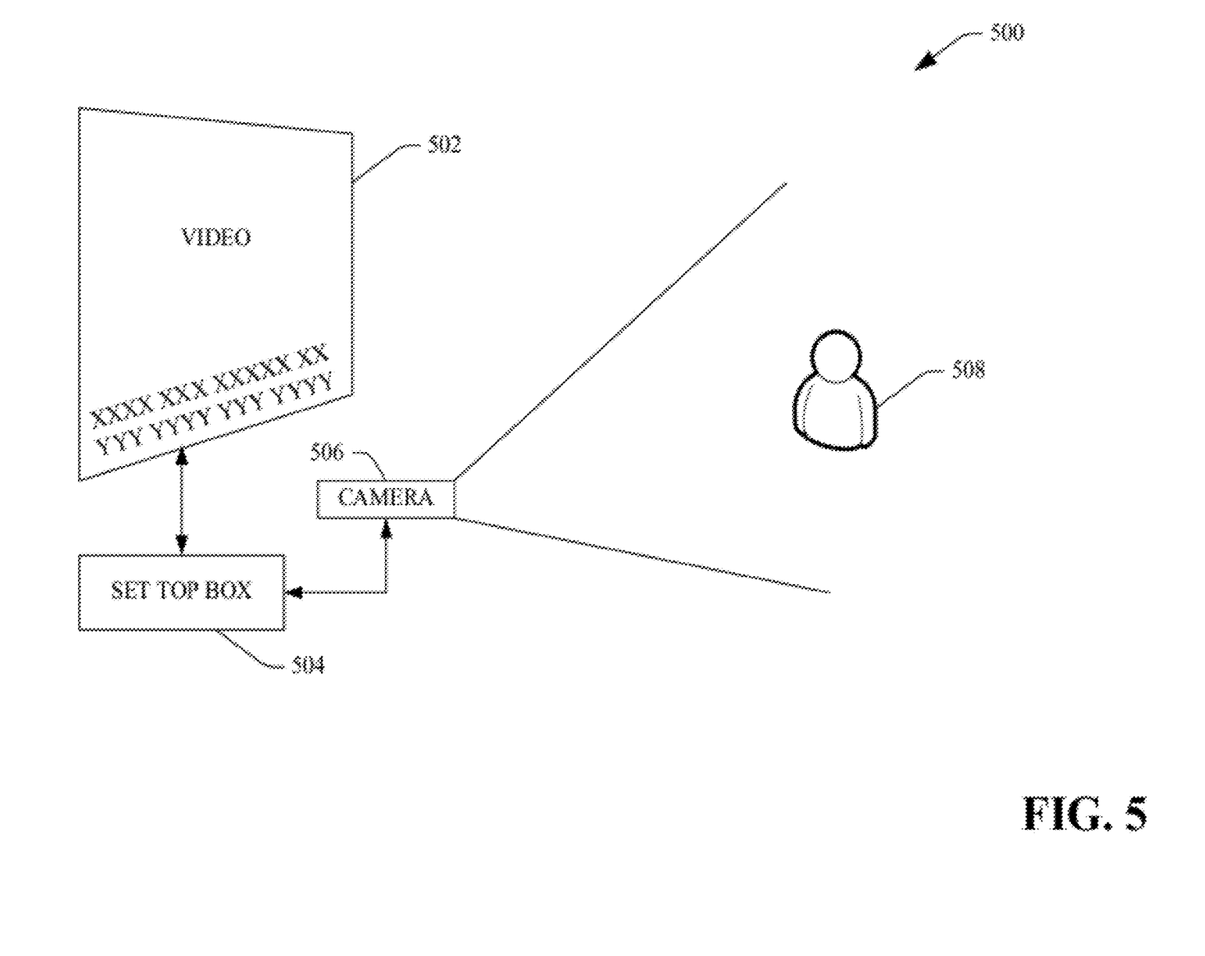
FIG. 5 illustrates an exemplary system where a user can interact with subtitles in different languages included in a video by way of captured gestures.

Now referring to FIG. 5, an exemplary environment 500 where aspects described herein can be practiced is displayed. The environment 500 may include a television 502 that is utilized to display video, such as a video file that has been described above. Pursuant to an example, the video can be displayed by way of a set top box, which may be, for instance, a video game console, a cable box, or the like. A video camera 506 may be in communication with the set top box 504, and may capture gestures of a user 508. For instance, the camera 506 may include an infrared camera that is able to sense depth of limbs of the user 508, such that the camera 506 can capture certain gestures of the user 508. The set top box 504 can receive images captured by the camera 506 to process and identify such gestures.

Pursuant to a particular example, the set top box 504 may be a video game console, and the video may be displayed on the television 502 by way of a particular video game that is being played by way of the video game console. This video game may be retained in a hard drive of the video game console or may be played as a disk in the video game console. The video game may be configured to assist the user 508 in second language learning, and the user 508 can interact with the video as described above through gestures. Therefore, the user may point to a particular word, which may cause a corresponding word in either the source or target language to be highlighted or a definition of such word to be presented to the user 508. Additionally, for instance, the camera 506 can be equipped with a microphone that can detect audible commands of the user 508, such that the user 508 can make certain selections of words, portions of the video, etc.

Figure 6:
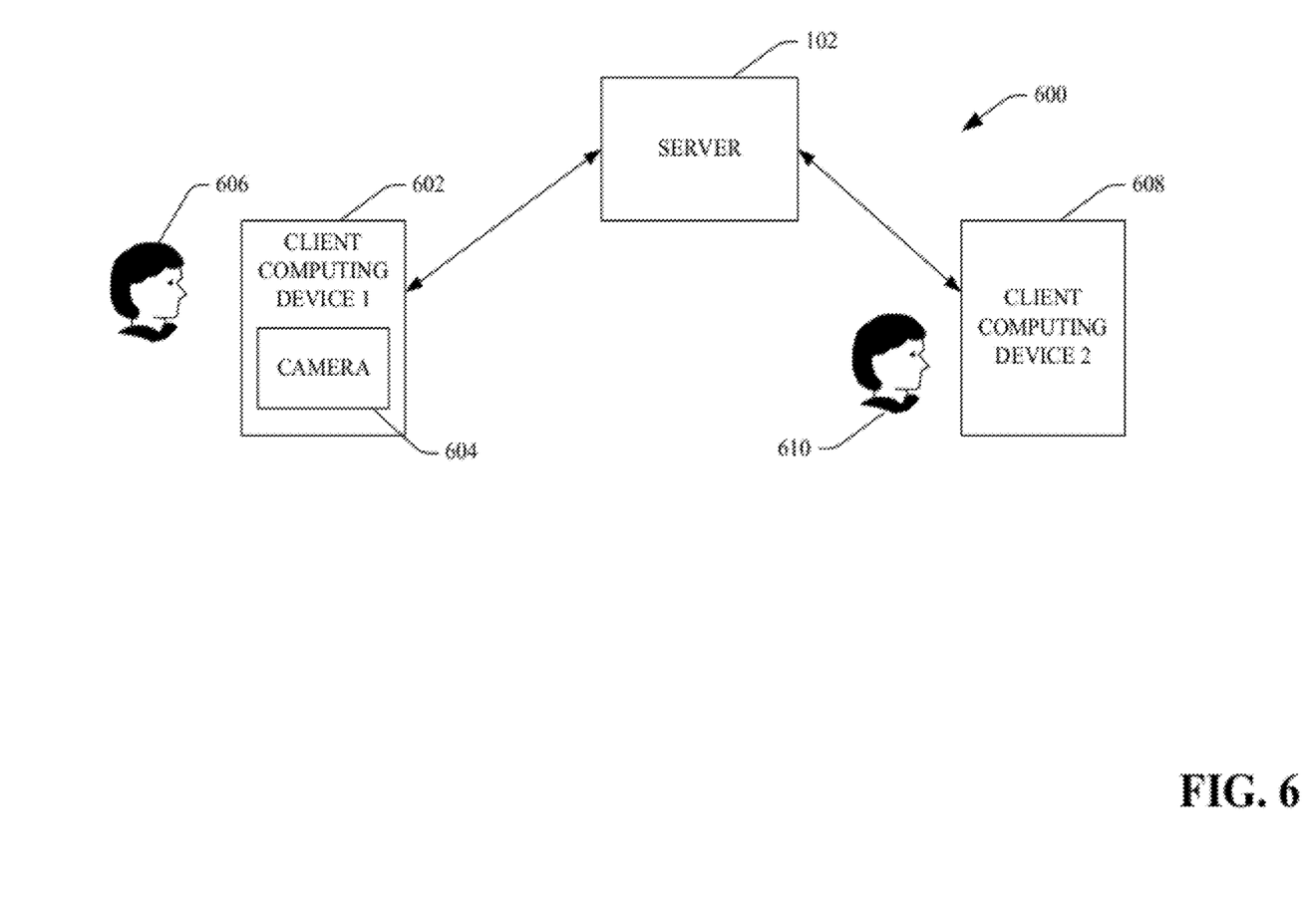
FIG. 6 illustrates an exemplary system where two client computing devices can be utilized in a video chat, where subtitles in different languages are displayed together with the video data transmitted between the client computing devices.

With reference now to FIG. 6, a functional block diagram of an exemplary system 600 that facilitates second language learning is illustrated. The system 600 comprises the server 102. A first client computing device 602 is in communication with the server 102 by way of a broadband network connection. The first client computing device 602 comprises a camera 604 that can be configured to capture video (and audio) of a first user 606. Therefore, for instance, the client computing device 602 may be a personal computer and the camera 604 may be a web cam. In another example, the client computing device 602 may be a mobile telephone or a tablet with a front-facing camera, such that video of the first user 606 can be captured. Video captured by way of the camera 604 on the first client computing device 602 can be transmitted to the server 102. In this exemplary embodiment, the server 102 may comprise the system 300 that has been described above, such that the video from the client computing device 602 can be processed to cause source language subtitles, target language subtitles, and optionally definitions to be included in the video received from the client computing device 602. A second client computing device 608 used by a second user 610 may also be in communication with the server 102 by way of a broadband connection, and can receive the processed video from the server 102 in real-time or near real-time. Thus, the first user 606 and the second user 610 can conduct a video chat, wherein video in such chat can be processed to facilitate second language learning. Accordingly, the first user 606 can speak in a source language and the second user 620 may have a native language different than the source language.

Therefore, at the first client computing device 602, video of the second user 610 can be shown, spoken words of the second user 610 can be heard in the native language of the second user 610, subtitles of such words can be shown in the native language of the second user 610, and subtitles in the native language of the first user 606 can be shown. In contrast, the video transmitted from the first client computing device 602 to the second client computing device 608 by way of the server 102 can include spoken words of the first user 606 in the native language of the first user 606, subtitles for such spoken words in the native language of the first user 606, and subtitles in a native language of the second user 610. Such system 600 can facilitate distance learning of second languages between two users that natively speak different languages.

Additionally, while the server 102 is shown as being an intermediate between the first computing device 602 and the second computing device 608, it is to be understood that the first computing device 602 may be in direct communication with the second client computing device 608 by way of a peer-to-peer connection. In such an embodiment, both the first client computing device 602 and the second client computing device 608 can include the system 300 described above, such that video received from the other party can be processed in real-time or near real-time.

Figure 7:
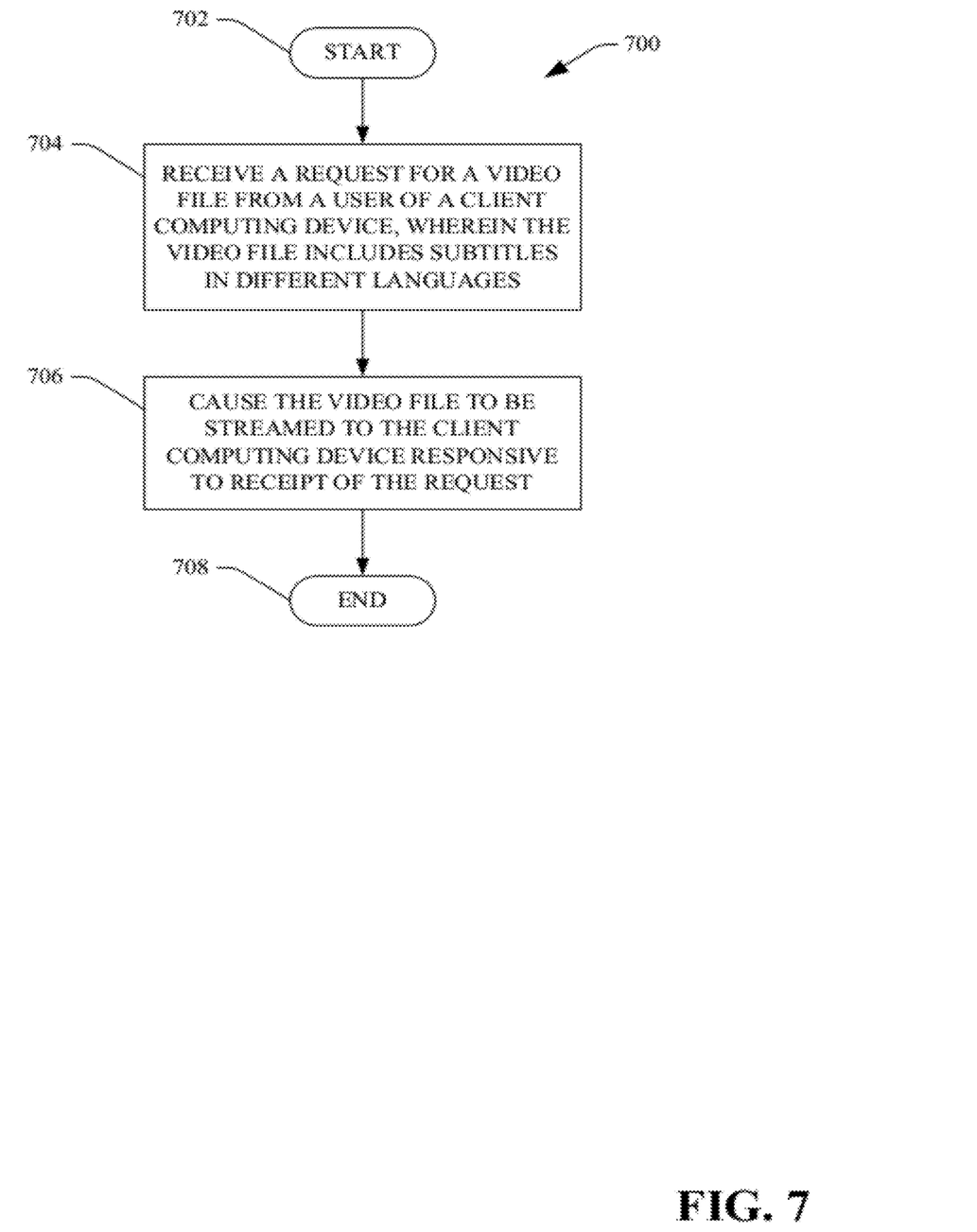
FIG. 7 is a flow diagram that illustrates an exemplary methodology for causing a video file to be streamed to a client computing device, wherein such video file comprises two sets of subtitles in different languages that are synchronized with spoken words in the video file.
Figure 8:
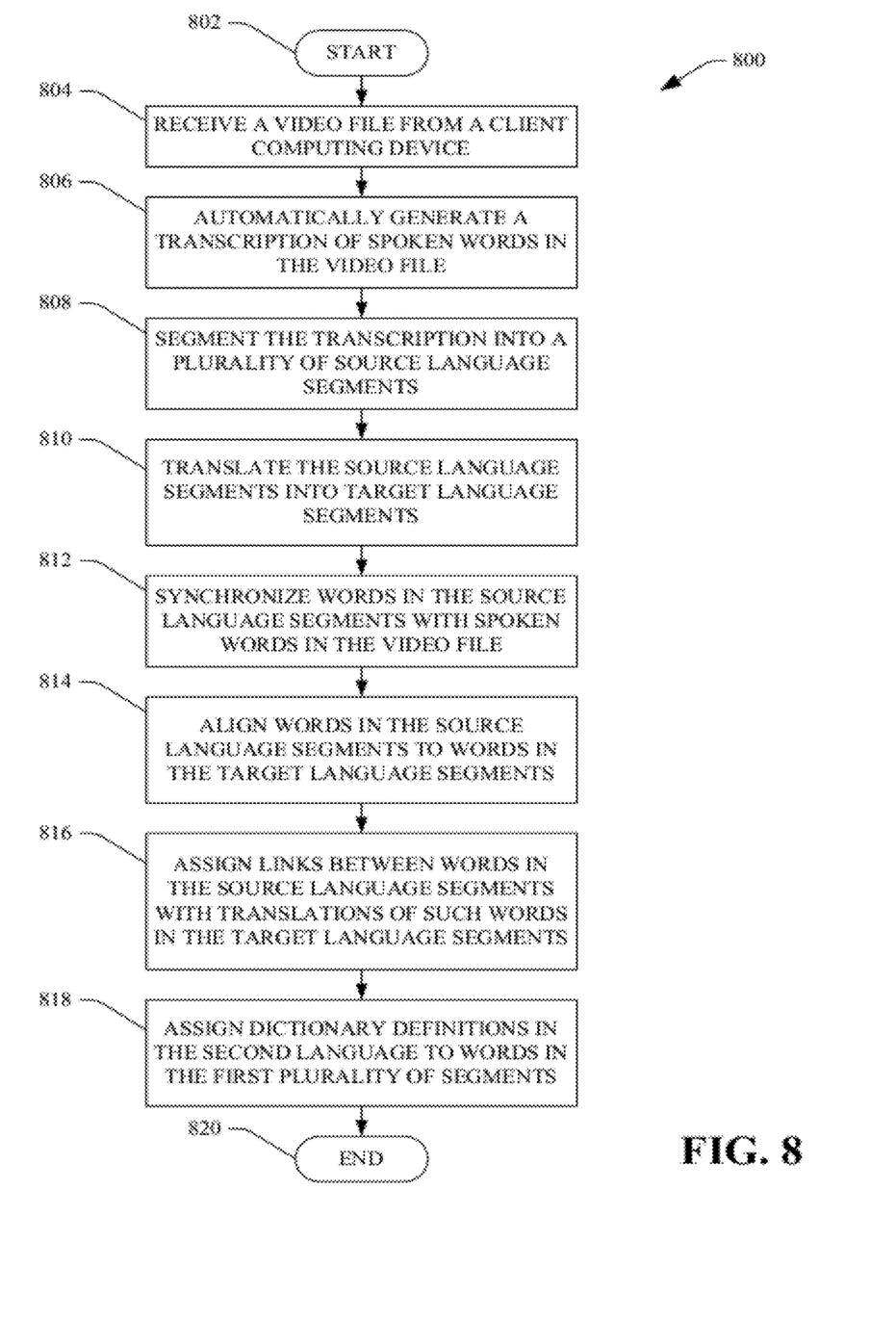
FIG. 8 is a flow diagram that illustrates an exemplary methodology for processing a video to cause such video to include subtitles in two different languages that are synchronized with spoken words in the video file.
Figure 9:
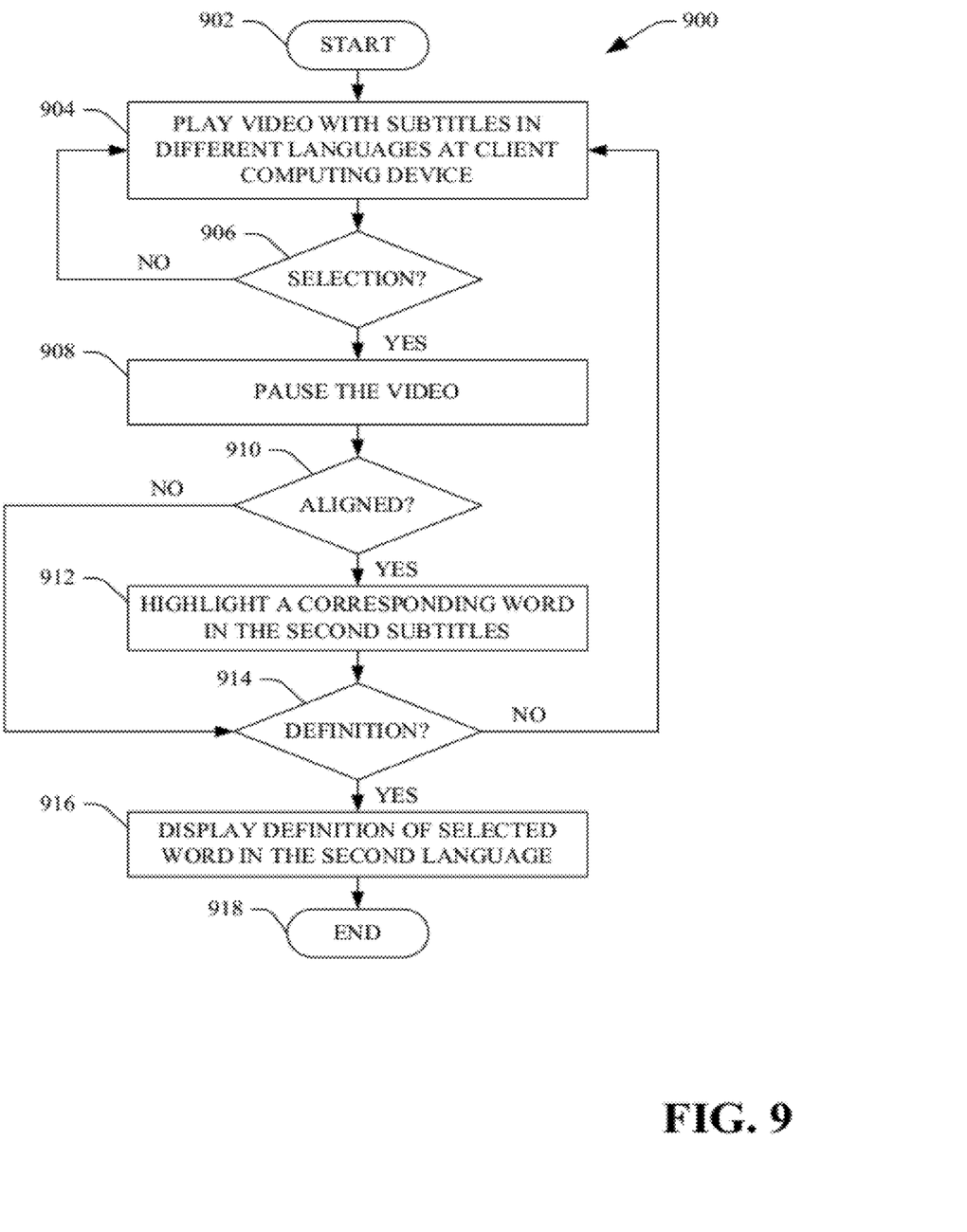
FIG. 9 is a flow diagram that illustrates an exemplary methodology for interacting with a video file at a client computing device.

With reference now to FIGS. 7-9, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be computer storage, such as memory, hard drive, CD, DVD, flash drive, or the like. As used herein, the term "computer-readable medium" is not intended to encompass propagated signals.

Turning now to FIG. 7, an exemplary methodology 700 that facilitates causing a video file to be streamed to a client computing device is illustrated. The methodology 700 starts at 702, and at 704 a request for a video file is received from a client computing device, wherein the video file comprises audibly spoken words in a source language and subtitles in the source language that are synchronized in time with the audibly spoken words. Additionally, as described above, the subtitles in the source language can be segmented into a plurality of source language segments. The video file also includes target language subtitles, wherein the target language subtitles are segmented into a plurality of target language segments that are mapped to the source language segments, and wherein words in the source language segments are mapped to words in the target language segments. In other words, words in the source language segments can be aligned with words in the target language segments.

At 706, the video file is caused to be streamed to the client computing device responsive to receipt of the request. The video file, when viewed at the client computing device, includes the source language subtitles and the target language subtitles that are displayed in synchronization with the audibly spoken words in the video file. Accordingly, the video file facilitates second language learning. The methodology 700 completes at 708.

Now referring to FIG. 8, an exemplary methodology 800 that facilitates second language learning is illustrated. The methodology 800 starts at 802, and at 804, a video file from a client computing device is received, wherein the video file comprises spoken words in a first language.

At 806, a transcription in the first language is automatically generated for spoken words in the video file.

At 808, the transcription is segmented into a plurality of segments (source language segments) through utilization of natural language processing. When segmentation is complete, each segment can include at least one word in the first language.

At 810, the source language segments are translated into a plurality of target language segments, where words in the target language segments are in a target language.

At 812, words in source language segments are synchronized with spoken words in the video file. At 814, words in the source language segments are aligned to words in the target language segments, such that a translation between a first word and a second word in corresponding segments are shown in graphical relation to each other (vertically aligned) when the video file is played at a client computing device.

At 816, links are assigned between words in the source language segments with translations of such words in the target language segments. At 818, dictionary definitions are assigned to words in the source language segments, wherein such definitions are in the target language. Accordingly, if a user when playing a video file selects a word in a source language segment, a definition of such word in the target language can be presented to the user. The methodology 800 completes at 820.

With reference now to FIG. 9, an exemplary methodology 900 that facilitates displaying a video that can be utilized in connection with second language learning is illustrated. The methodology 900 starts at 902, and at 904 a video file is played at a client computing device. At 906, a determination is made regarding whether a user has selected a word in subtitles displayed in the video file. If it is determined that no selection has been made, then the methodology can return to 904 where the video is continued to be played and subtitles in two languages are shown to a viewer. If, however, a selection of a word in a first language in one of the sets subtitles displayed to the user has been made at 906, then at 908 the video can be paused. At 910, a determination is made regarding whether the selected word is aligned with another word in subtitles in the other language in the video. If the selected word in the first language is aligned with a word in the second language, then the word in the second set of subtitles is highlighted at 912. If the selected word at 910 is determined to have no aligned word corresponding thereto, then the methodology 900 can proceed to 914 where a determination is made regarding whether a definition for the word in the second language exists for the selected word. If no definition exists, then the methodology 900 can return to 904 where the video can continue to be played. If, however, a definition does exist for the selected word, then at 916, definition of the selected word and a second language is presented to the user. The methodology 900 completes at 918.

Figure 10:
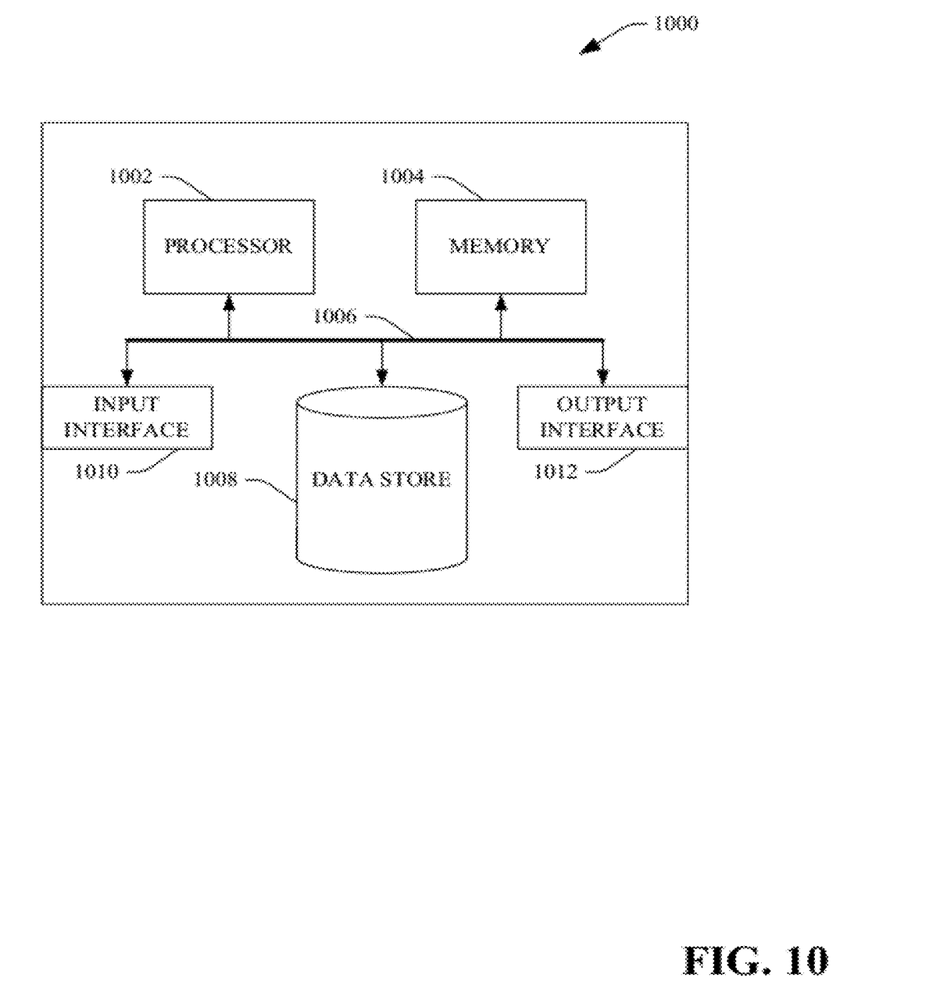
FIG. 10 is an exemplary computing system.

Now referring to FIG. 10, a high-level illustration of an exemplary computing device 1000 that can be used in accordance with the systems and methodologies disclosed herein is illustrated. For instance, the computing device 1000 may be used in a system that supports processing a video to cause subtitles in different languages to be included therein. In another example, at least a portion of the computing device 1000 may be used in a system that supports playing an interactive video that facilitates second language learning. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store subtitles in various languages, word alignments, etc.

The computing device 1000 additionally includes a data store 1008 that is accessible by the processor 1002 by way of the system bus 1006. The data store may be or include any suitable computer-readable storage, including a hard disk, memory, etc. The data store 1008 may include executable instructions, subtitles, synchronization data, word alignments, etc. The computing device 1000 also includes an input interface 1010 that allows external devices to communicate with the computing device 1000. For instance, the input interface 1010 may be used to receive instructions from an external computer device, a user, etc. The computing device 1000 also includes an output interface 1012 that interfaces the computing device 1000 with one or more external devices. For example, the computing device 1000 may display text, images, etc. by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising:
receiving a request from a user of a client computing device for a video file, wherein the video file comprises:
audibly spoken words in a source language;
subtitles in the source language that are synchronized with the audibly spoken words, the subtitles segmented into a plurality of source language segments, each source language segment comprising a respective plurality of source language words; and
subtitles in a target language that are segmented into a plurality of target language segments, each target language segment comprising a respective plurality of target language words, each source language segment in the source language segments mapped to a respective target language segment in the target language segments, and each source language word in each source language segment mapped to a respective target language word in the respective target language segment; and
causing the video file to be streamed to the client computing device responsive to receipt of the request, wherein the video file, when viewed at the client computing device, comprises the subtitles in the source language and the subtitles in the target language that are displayed in synchronization with the audibly spoken words, wherein the video file, when viewed at the client computing device, includes words in the subtitles in the source language and words in the subtitles in the target language that are highlighted as corresponding audibly spoken words are output.

2. The method of claim 1, wherein the video file further comprises definitions in the target language for words in the subtitles in the source language, such that a first definition in the target language for a word in the subtitles in the source language is displayed to the user responsive to the user selecting the word in the subtitles in the source language.

3. The method of claim 1, further comprising:
receiving an indication that the user has selected a word in the subtitles in the source language; and
transmitting a definition of the word in the target language to the client computing device.

4. The method of claim 1, further comprising:
prior to receiving the request for the video file from the user, receiving the video file from a portable computing device of a second user, wherein the video file, when received from the second user, fails to include the subtitles in the source language and the subtitles in the target language; and
subsequent to receiving the video file from the portable computing device of the second user and prior to receiving the request for the video file from the user, processing the video file to cause the subtitles in the source language and the subtitles in the target language to be included in the video file and synchronized with the audibly spoken words in the video file.

5. The method of claim 1, further comprising:
prior to receiving the request for the video file from the user, receiving the video file from a second user, wherein the video file, when received from the second user, fails to include the subtitles in the source language and the subtitles in the target language; and
subsequent to receiving the video file from the second user and prior to receiving the request for the video file from the user, utilizing speech recognition to automatically generate the subtitles in the source language.

6. The method of claim 5, further comprising:
subsequent to utilizing speech recognition to automatically generate the subtitles in the source language, utilizing natural language processing to automatically generate the plurality of source language segments, wherein segments in the plurality of source language segments are phrases.

7. The method of claim 6, further comprising:
subsequent to utilizing natural language processing to automatically generate the source language segments, utilizing machine translation to automatically generate the target language segments.

8. The method of claim 7, further comprising:
subsequent to utilizing machine translation to automatically generate the target language segments, synchronizing the words in the subtitles in the first language with the audibly spoken words in the source language; and
when words in the source language segments are not aligned with words in the target language segments that are translations of the words in the source language segments, aligning words in the source language segments with words in the target language segments, such that a first word in a displayed source language segment and a second word in a displayed target language segment are aligned with one another, the second word being a translation of the first word.

9. The method of claim 1, wherein the video further comprises:
subtitles in a second target language, wherein the subtitles in the second target language are segmented into a third plurality of segments, each segment in the third plurality of segments comprising a second plurality of target language words, each segment in the third plurality of segments mapped to a respective segment in the source language segments, each word in each segment of the third plurality of segments mapped to a respective word in a respective source language segment, and wherein the subtitles in the second target language are caused to be presented to the user on the client computing device subsequent to a request from the user to display the subtitles in the second target language together with the subtitles in the source language instead of displaying the subtitles in the second target language together with the subtitles in the source language.

10. The method of claim 1, further comprising:
receiving an indication from the user that at least one word in the subtitles in the target language are incorrect; and
updating the subtitles in the target language responsive to receiving the indication from the user.

11. The method of claim 1, wherein the video file is caused to be streamed to a web browser executing on the client computing device.

12. The method of claim 1, wherein a source language segment comprises a first word and a corresponding target language segment comprises a second word that is a translation of the first word, and the first word initially being misaligned with the second word, the method further comprising aligning the first word with the second word such that, when the video file is played, the first word is shown in graphical alignment with the second word.

13. A system comprising:
a processor; and
a memory comprising a plurality of components that are executable by a processor, the plurality of components comprising:
- a receiver component that receives a request for a video file from a client computing device, wherein the video file has been processed to include first subtitles in a source language that corresponds to audio of the video file and second subtitles in a target language, the first subtitles and the second subtitles have been segmented into a first plurality of segments and a second plurality of segments, respectively, wherein each segment in the first plurality of segments comprises a respective plurality of source language words and each segment in the second plurality of segments comprise a respective plurality of target language words, segments from the first plurality of segments are linked with corresponding segments in the second plurality of segments and are synchronized with spoken words in the source language in the video file, and each source language word in a respective segment in the first plurality of segments is mapped to a respective target language word in a respective linked segment in the second plurality of segments; and
- a transmitter component that causes the video file to be transmitted to the client computing device responsive to the receiver component receiving the request for the video file, wherein the video file, when viewed at the client computing device, comprises the first subtitles and the second subtitles that are displayed in synchronization with the audibly spoken words, and includes words in the first subtitles and words in the second subtitles that are highlighted as corresponding audibly spoken words are output.

14. The system of claim 13, wherein the transmitter component causes the video file to be streamed to the client computing device.

15. The system of claim 13, wherein the video file has been further processed to include definitions for words in the first subtitles that are in the target language, wherein the definitions for the words in the first subtitles are linked to corresponding words in the first subtitles.

16. The system of claim 13 comprised by a server, wherein the request for the video is received by way of a web browser, and wherein the transmitter component causes the video to be transmitted to the web browser for display thereon.

17. The system of claim 13 comprised by a second client computing device.

18. The system of claim 13 comprised by a video game console.

19. A computer-readable data storage device storing processor-executable code that, when executed by a processor, causes the processor to perform acts comprising:
- receiving a video file from a client computing device, wherein the video file comprises spoken words in a first language;
- automatically generating subtitles of the spoken words in the first language;
- utilizing natural language processing, automatically segmenting the first subtitles into a plurality of segments, wherein each segment in the plurality of segments comprises at least one word in the first language;
- utilizing machine translation, automatically translating the first plurality of segments into a second plurality of segments, wherein words in the second plurality of segments are in a second language, and wherein each segment in the first plurality of segments is mapped to a respective segment in the second plurality of segments;
- synchronizing words in the first plurality of segments with spoken words in the video file;
- when a word in a first segment in the first plurality of segments is misaligned with a translation of the word in a corresponding second segment in the second plurality of segments, aligning the word in the first segment to the translation thereof in the second segment, such that the word and the translation thereof, when the video file is played, are shown in graphical alignment, assigning links between words in the first plurality of segments with translations of such words in the second plurality of segments;
- assigning dictionary definitions to words in the first plurality of segments, wherein the dictionary definitions are linked to the words in the first plurality of segments and are in the second language;
- receiving a request for the video file from a client computing device; and
- causing the video file to be streamed to the client computing device responsive to receipt of the request.

20. The computer readable data storage device of claim 19, further comprising highlighting words in the first plurality of segments and words in the second plurality of segments while corresponding words in the video file are spoken.

* * * * *